Sept. 22, 1936.    W. BREDTSCHNEIDER    2,055,331
COAL DUST FURNACE
Filed July 30, 1932    2 Sheets-Sheet 1

Inventor
Walter Bredtschneider
by *[signature]*
Attorney

Sept. 22, 1936.  W. BREDTSCHNEIDER  2,055,331
COAL DUST FURNACE
Filed July 30, 1932   2 Sheets-Sheet 2

INVENTOR
Walter Bredtschneider
BY
ATTORNEY

Patented Sept. 22, 1936

2,055,331

UNITED STATES PATENT OFFICE 2,055,331

COAL-DUST FURNACE

Walter Bredtschneider, Vitkovice-Zelezarny, Czechoslovakia

Application July 30, 1932, Serial No. 626,726
In Germany January 21, 1931

6 Claims. (Cl. 110—104)

This invention relates to fuel burners and more particularly refers to improvements in burners for pulverized fuel and in means for controlling their operation.

The primary object of this invention is to provide a new method of regulating the operation of furnaces where a plurality of burners are distributed throughout the combustion zone, whereby all the burners can be simultaneously controlled without altering such ratio between their respective rates of operation as might have been established in advance according to the individual share of the total furnace load to be allotted to each burner.

Another object of the invention is to provide a novel and improved organization, consisting of a burner and a feeding device therefor, so designed that when used in an installation comprising a plurality of burners, it will be possible to adjust the elements affecting the operation of each individual burner so as to establish a predetermined relative ratio in the distribution of the total quantity of air and fuel supplied to the various burners, and then to collectively control the supply of air and fuel in accordance with the load on the furnace, without affecting the relative operating ratio previously established between the various burners.

A further object is to provide in a fuel burner comprising a nozzle through which fuel is supplied to a furnace and means for admitting combustion air to said furnace and for mixing it with the fuel, a novel and improved arrangement of combustion air regulating means, whereby the quantity of air supplied to the burner may be varied during the operation of the furnace, without affecting the arrangement or inclination of the blades or vanes, or equivalent elements, which may be employed to impart to the combustion air a whirling motion for the purpose of thoroughly mixing said air with the fuel and facilitating the combustion of the mixture.

A still further object is to provide in an organization of the character mentioned, novel and improved means for admitting pulverized fuel to a burner, said fuel admitting means being adjustable both as to feeding capacity and speed.

Other objects and advantages of the present invention will more fully appear as the description proceeds and will be set forth and claimed in the appended claims.

My invention is illustrated by way of example in the accompanying drawings, in which.

Figure 1:
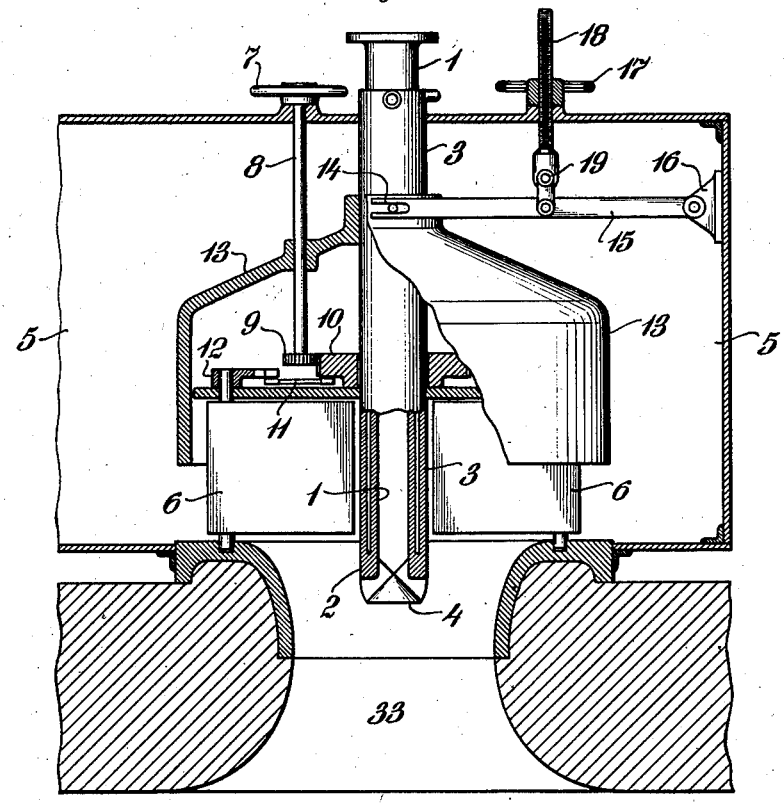
Fig. 1 is a view in elevation, partly sectioned, of a burner embodying some of the features of my invention.

In certain types of furnaces, particularly furnaces with a radiation heating surface, it is important to distribute the action and the effect of the fire over the entire area of the combustion space, and to provide means for controlling the operation of the burners located at various points without rendering the operation of the plant too complicated and difficult. Each burner should accordingly be regulated for a certain individual duty and the relative rate of operation between the various burners should be maintained throughout the operation of the plant, irrespective of the variations in the furnace load.

With the types of burners heretofore in use, requiring individual control of all their elements, I have found it to be next to impossible to maintain a definite ratio of operation between the various burners when regulation must be effected in the air and fuel feed, according to changes in the load.

I have also found that given certain conditions of operation, it is desirable to adjust the vanes or other similar elements provided for imparting a rotary or whirling motion to the combustion air at a certain angle calculated to produce the best mixture with the fuel and the best type of flame; and to vary the volume of combustion air admitted to the burner when load conditions change, without altering the angle at which said vanes have been set. Ordinarily, the volume of combustion air admitted to the burners is controlled by varying more or less the inclination of the vanes, with the result that the greater the quantity of air admitted, the less effective the whirling motion will be because of the lesser angle at which the vanes will have been disposed. This is directly in contradiction with the requirements of practical operation where the burners operating at a smaller ratio, although requiring a lesser whirling motion than the burners operating at a greater ratio, also require a smaller volume of air. It is, therefore, essential that the intensity and direction of the whirling motion be adjusted independently of the section through which the combustion air is admitted to the burner and vice versa.

It is also, of course, important that these two factors be adjustable independently of each other while the furnace is in operation, in order to establish the best relation therebetween and also the best relation between the various burners.

Therefore, according to this invention, adjusting members are provided for the adjustment of the proportionate share of each individual burner in the total fire effect, by regulating the feed of the pulverized fuel, such as coal-dust, for instance, and the combustion air at every burner or at every set of burners, and the whirling effect of the combustion air, said adjusting members distributing the supplied air to the individual burners without unfavorably affecting the position of the air deflecting vanes. The various burners thus having been individually regulated, the regulation of the air supplied to the furnace in accordance with the load to which the furnace is subjected can be effected by a regulating device, that is common to all burners and which does not affect the percentage of the distribution of the supplied air. For adjusting the proportionate share of the coal-dust supplied to each individual burner, there are furthermore provided, according to this invention, feeding means, the individual capacity of which can be varied during operation and which can be driven together and with variable speed from a common source of power.

These feeding means are shown in the form of rotatory drums, having their periphery subdivided into cells, the distribution of the coal-dust supplied to each burner being effected by adjusting the capacity of the individual cell drums, whereas the regulation of the quantity of coal-dust supplied according to the load on the furnace is effected by varying the common number of revolutions of all the cell drums, the previously adjusted capacity of the individual cell drums, determining their relative proportion in the distribution of the coal-dust remaining the same at all loads.

The new arrangements and combinations of parts here presented are particularly effective, when the fuel is mixed with the greater proportion of the combustion air within the burner.

1, Fig. 1, is a vertical central tube supplying the coal-dust in suitable amounts to the mixing nozzle 2. The tube 1 is enclosed in a cooling tube 3 by which the coal-dust is protected against any detrimental influence of the temperature to which the tube 1 would otherwise be exposed. The mixing nozzle 2 is provided with a cone 4 by means of which the coal-dust is intermingled with the current of the hot combustion air, streaming from the main air passage 5 into the combustion space 33. The coal-dust will then become mixed in the burner constituted by the just mentioned parts 1 to 4, with the main amount of the combustion air so that a readily combustible mixture passes from the burner nozzles into the combustion chamber 33. The combustion air may be supplied, for instance, by means of a fan which blows the air into the channel 5 which is common for all burners of the set of burners pertaining to a given furnace.

6 are the adjustable blades or vanes by means of which the combustion air may be given a certain whirling motion. The blades can be adjusted by means of a hand-wheel 7, a spindle 8 to the upper end of which said wheel is fixed, a cog-wheel 9 secured to the lower end of said spindle, a toothed ring 10 meshing with the cog-wheel 9 and encompassing the cooling tube 3, and motion transmitting members 11 and 12. By suitably determining the angle of deflection or whirling of the air by means of the blades 6, the mixture of the air and the coal-dust entering into the combustion chamber 33 is shaped and directed in the intended manner.

For adjusting the proportionate share of the supply of air a control member 13 is provided by which the amount of the air streaming to the mixing nozzle 2 can be adjusted without affecting the position of the deflecting blades 6. Control member 13 by means of which the free sectional area for the passage of the air flowing into the blade channels is adjusted, encloses and surrounds the burner like a bell and is movable in direction of the burner axis. For this purpose member 13 is suspended from a forked lever 15 by means of pivots 14, and this lever is pivotally mounted at the wall of the air channel 5 by means of a bracket 16; and it can be operated by means of hand-wheel 17, threaded spindle 18 and the hinge 19, whereby said control member or bell 13 can be lifted and lowered. The regulation of the amount of the air supplied to the furnace in accordance with the load upon the same is then effected for all burners in common either by varying the number of revolutions of the fan, or in any other suitable manner.

The supply and distribution of the coal-dust to each burner is effected by a rotatory, drum-like member 22 provided around its circumferential wall with cells 23 for the reception of the coal-dust. All members or drums 22 of the plant are preferably secured to a common horizontal shaft 21 which extends through all distributing devices pertaining to the burners of the respective set. The coal-dust is supplied to the drum 22 through a hopper 24; it fills the cells 23 and leaves the device through the passage 25 which is placed above and in continuation of central tube 1 of the burner and delivers the coal dust thereto.

Figure 2:
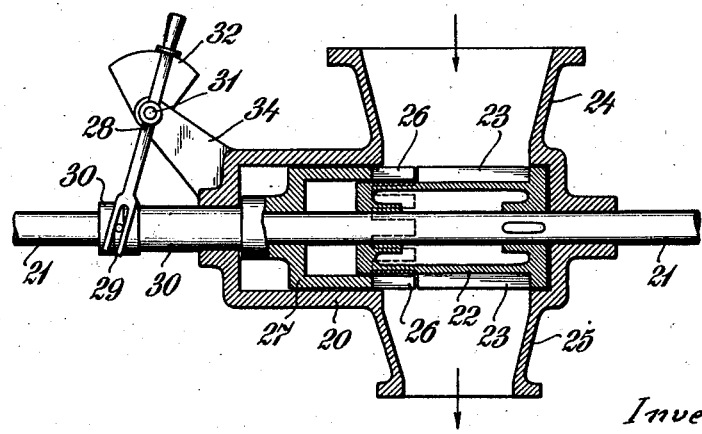
Fig. 2 is a vertical longitudinal section through a device for feeding pulverized fuel to said burner.
Figure 3:
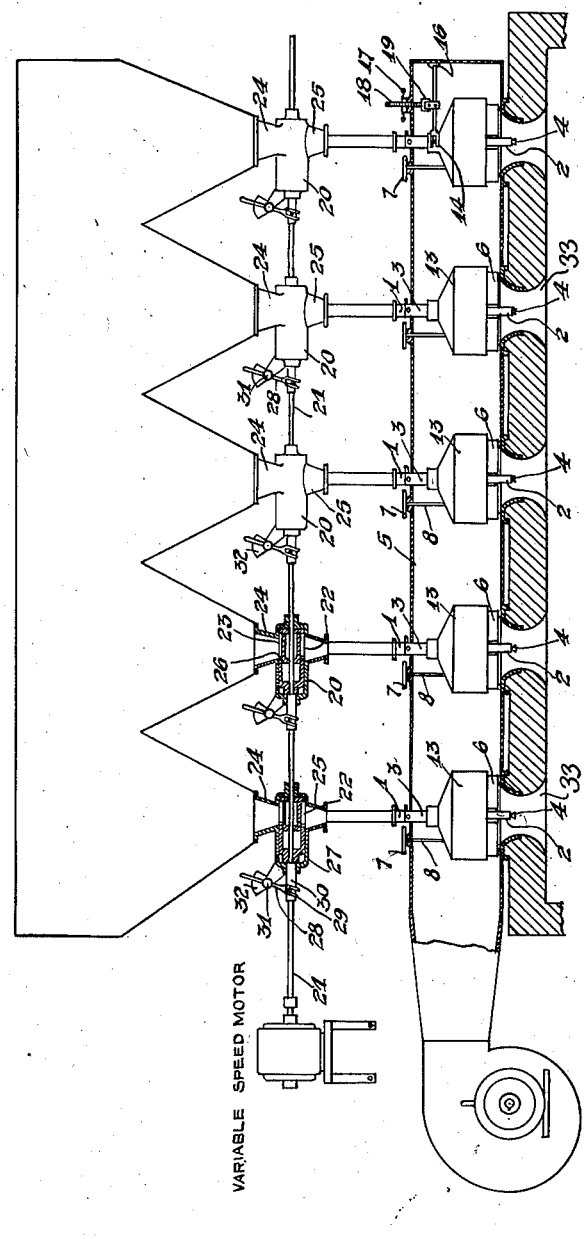
Fig. 3 is a diagrammatic view in elevation, partly sectioned, of a complete installation embodying my invention, and actuating means of some of the air control members not being shown.

The size of the cells 23 and, thus, the amount of coal-dust carried around by them, can be varied by means of plunger members 26, projecting from a sleeve 27 shiftable upon the shaft 21 by means of a lever 28, said lever being supported upon a pivot 31 projecting from a lug 34 of casing 20 of the device. The lever 28 is coupled with the sleeve 27 by means of a collar 30, having a circular groove engaged by two pins carried by the end 29 of said lever, and can be adjusted along a sector 32 and secured thereto in its adjusted position. It must be understood that sleeve 27 is loose on shaft 21 and will rotate with said shaft when moved from the position shown in Fig. 2 where plunger members 26 are out of engagement with cells 23 to a position where members 26 will enter said cells. The engagement of sleeve 27 with the drum takes place after the fashion of an ordinary toothed clutch, since the drum rotates continuously while the sleeve remains stationary when disengaged therefrom.

The ratio of distribution of the coal-dust supplied to the furnace by each burner is regulated by adjusting the capacity of cells 23, whereas the regulation in correspondence with the load upon the furnace is effected by varying the number of revolutions of the cell drums. For this purpose the shafts 21 of all the cell drums of the furnace are driven in common from one source of power and with a variable number of revolutions.

Coal-dust furnaces designed according to this invention are particularly advantageous for use in connection with steam boilers with radiation superheater, boilers of the Löffler type, and similar boilers.

Finally, I wish it to be understood that I do not limit myself to the details shown and described solely by way of example; it being possible to vary the constructional details in many respects without departing from the invention.

I claim:

1. In combination, a plurality of coal-dust burners, adjustable vanes associated with each burner and controlling the shape of the flame, a mechanically driven rotary coal-dust charging mechanism associated with each burner, a main air supply channel for all burners in common, a device for delivering the main quantity of the air to the burners through this channel, a device associated with each burner for the adjustment of its share of the air admission independently of the position of the vanes, a common rotating driving means for all the coal-dust charging mechanisms, and individual means for every coal-dust charging mechanism for adjusting its charging capacity for each complete revolution thereof.

2. In combination, a plurality of coal-dust burners, adjustable vanes associated with each burner and controlling the shape of the flame, a mechanically driven rotary coal-dust charging mechanism associated with each burner, a main air supply channel for all burners in common and enclosing the burners, a device for delivering the main quantity of the air to the burners through this channel, a device associated with each burner for the adjustment of its share of the air admission independently of the position of the vanes, a common rotating driving means for all the coal-dust charging mechanisms, and a member for every coal-dust charging mechanism slidable relative to such mechanism for adjusting its charging capacity for each complete revolution thereof.

3. In combination, a furnace, a plurality of coal-dust burners therefor, a mechanically driven coal-dust charging mechanism associated with each burner, a common rotating driving means for all coal-dust charging mechanisms, said coal dust charging mechanisms each comprising a cylindrical rotor having a plurality of coal-dust receiving open-ended cells on its face, and a slidable sleeve associated with each of said mechanisms, said sleeve having fingers which may be projected into said cells to adjust the capacity of said charging mechanism.

4. In combination, a fuel burner, a rotary drum delivery member having a circumferential series of open ended cells for delivering pulverized fuel to said burner, and a plunger member axially adjustable with respect to said delivery member, said plunger member having a plurality of filler extensions adapted to project within said cells to a greater or lesser extent, so as to vary the capacity of said delivery member.

5. In combination, a fuel burner, a rotary drum delivery member having a circumferential series of open ended cells for delivering pulverized fuel to said burner, a shaft carrying said drum for transmitting rotary power thereto, and a plunger member slidably carried by said shaft and axially adjustable with respect to said delivery member, said plunger member having a plurality of extensions adapted to project into said cells to a greater or lesser extent so as to vary the capacity of said delivery member.

6. In combination, a plurality of coal-dust burners, adjustable vanes associated with each burner and controlling the shape of the flame, a mechanically driven rotary coal-dust charging mechanism associated with each burner, a main air supply channel for all burners in common, a device for delivering the main quantity of air to the burners through this channel, a device for all burners in common for regulating the main air supply in accordance with the total need, a device associated with each burner for the adjustment of its share of the air admission independently of the position of the vanes, a common rotating driving means for all the coal-dust charging mechanisms, a device for regulating the number of revolutions of the latter in accordance with the total need of coal-dust, and individual means for every coal-dust charging mechanism for adjusting its charging capacity for each complete revolution thereof.

WALTER BREDTSCHNEIDER.